(12) United States Patent
Iwasaki (10) Patent No.: US 9,742,983 B2
(45) Date of Patent: Aug. 22, 2017

(54) IMAGE CAPTURING APPARATUS WITH AUTOMATIC FOCUS ADJUSTMENT AND CONTROL METHOD THEREOF, AND STORAGE MEDIUM

(71) Applicant: CANON KABUSHIKI KAISHA, Tokyo (JP)

(72) Inventor: Naoki Iwasaki, Kawasaki (JP)

(73) Assignee: CANON KABUSHIKI KAISHA, Tokyo (JP)

(*) Notice: Subject to any disclaimer, the term of this patent is extended or adjusted under 35 U.S.C. 154(b) by 0 days.

(21) Appl. No.: 15/012,085

(22) Filed: Feb. 1, 2016

(65) Prior Publication Data
US 2016/0227102 A1 Aug. 4, 2016

(30) Foreign Application Priority Data
Feb. 2, 2015 (JP) ................. 2015-018797

(51) Int. Cl.
H04N 5/232 (2006.01)
H04N 9/04 (2006.01)
H04N 5/369 (2011.01)

(52) U.S. Cl.
CPC ..... *H04N 5/23212* (2013.01); *H04N 5/23219* (2013.01); *H04N 5/3696* (2013.01); *H04N 9/045* (2013.01)

(58) Field of Classification Search
CPC . H04N 5/23212; H04N 5/23219; G03B 13/36
USPC .......... 348/345–349; 382/117, 118
See application file for complete search history.

(56) References Cited

U.S. PATENT DOCUMENTS

| 9,088,709 | B2* | 7/2015 | Ishii | H04N 5/23212 |
| 2005/0036676 | A1* | 2/2005 | Heisele | G06K 9/00221 |
| | | | | 382/159 |
| 2007/0064145 | A1* | 3/2007 | Sugimoto | G03B 13/36 |
| | | | | 348/345 |
| 2008/0278587 | A1* | 11/2008 | Izawa | G02B 7/36 |
| | | | | 348/207.11 |
| 2008/0284900 | A1* | 11/2008 | Abe | G03B 3/00 |
| | | | | 348/349 |
| 2012/0188408 | A1* | 7/2012 | Nakaoka | G02B 7/28 |
| | | | | 348/231.99 |

(Continued)

FOREIGN PATENT DOCUMENTS

| JP | 05-203865 A | 8/1993 |
| JP | 2008-197153 A | 8/2008 |
| JP | 2010-256824 A | 11/2010 |

*Primary Examiner* — Lin Ye
*Assistant Examiner* — Chan Nguyen
(74) *Attorney, Agent, or Firm* — Cowan, Liebowitz & Latman, P.C.

(57) ABSTRACT

An image capturing apparatus comprises a detection unit configured to detect a subject, a focus adjusting unit configured to adjust a position of a focusing lens of an imaging optical system so as to focus the imaging optical system on the subject, and a setting unit configured to set a focus detection area, which is an area within an image capturing screen where the focus adjusting unit detects focus, based on detection results of the detection unit, wherein the setting unit sets the focus detection area based on the position of the face of the subject in a case where the subject is moving, and sets the focus detection area based on the position of the eye of the subject in a case where the subject is still.

13 Claims, 7 Drawing Sheets

(56) References Cited

U.S. PATENT DOCUMENTS

2014/0023351 A1* 1/2014 Kaburlasos ........ H04N 21/4223
386/353
2014/0104483 A1* 4/2014 Kunishige .......... H04N 5/23212
348/349

* cited by examiner

|     | R  | Gr | R  | Gr | R  | Gr | R  | Gr | R  | Gr |
|-----|----|----|----|----|----|----|----|----|----|----|
| 250 | Gb | AF | Gb | AF | Gb | AF | Gb | AF | Gb | AF |
| 251 |    |    |    |    |    |    |    |    |    |    |
|     | R  | Gr | R  | Gr | R  | Gr | R  | Gr | R  | Gr |
|     | Gb | B  | Gb | B  | Gb | B  | Gb | B  | Gb | B  |
|     | R  | Gr | R  | Gr | R  | Gr | R  | Gr | R  | Gr |
| 251 | Gb | AF | Gb | AF | Gb | AF | Gb | AF | Gb | AF |
|     | R  | Gr | R  | Gr | R  | Gr | R  | Gr | R  | Gr |
|     | Gb | B  | Gb | B  | Gb | B  | Gb | B  | Gb | B  |

IMAGE CAPTURING APPARATUS WITH AUTOMATIC FOCUS ADJUSTMENT AND CONTROL METHOD THEREOF, AND STORAGE MEDIUM

BACKGROUND OF THE INVENTION

Field of the Invention

The present invention relates to autofocus technology in an image capturing apparatus such as a digital camera or a digital video camera.

Description of the Related Art

Contrast autofocus (contrast AF) and phase difference autofocus (phase difference AF) are known as ordinary methods of focus adjustment in an image capturing apparatus. Contrast AF is an AF method often used in a video camera or a digital still camera, and is an AF method in which attention is given to contrast information of an output signal of an image sensor, particularly a high-frequency component, and a focusing lens position where an AF evaluation value of the contrast AF is largest is adopted as an in-focus position.

On the other hand, as phase difference AF using an image sensor, a technique has been proposed in which pupil division of pixels in the image sensor is performed with a microlens, and by receiving light from a subject with the pupil-divided pixels, focus detection is performed at the same time as performing image capturing. In recent years, hybrid AF has also been proposed as a method that takes advantage of the merits of both contrast AF and phase difference AF. In Japanese Patent Laid-Open No. 2010-256824, a focusing lens is driven using results of focus detection in phase difference AF, and by changing to contrast AF in the vicinity of an in-focus position, fast and accurate focus detection is made possible.

Also, technology has been proposed in which these sorts of AF methods are used to focus on the face of a person. An example of contrast AF is disclosed in Japanese Patent Laid-Open No. 2008-197153, for example. Also, as described in Japanese Patent Laid-Open No. 2008-197153, a method is known in which AF is performed only once by a user operation (referred to below as 'one-shot AF'), and an AF method is known in which control is performed so as to always continue focusing on a subject (referred to below as 'continuous AF').

When causing focus to follow the face of a person by the above sort of AF control, there is some variation in results depending on the accuracy of face detection. For example, there are cases where even if the subject is being still, the detection results of the size or position of the face differs between frames depending on changes in luminance or changes in the amount of noise, or the like. Detection variation also occurs when focusing on eyes of a person, and particularly when the person is moving, there are many cases where the detection results of eyes differs between frames due to changes in the direction the face is facing. In such cases, if the above-described face detection result is used as-is for an AF frame, variation also occurs in the AF results, so the desired AF control is not possible.

SUMMARY OF THE INVENTION

The present invention was made in consideration of the above-stated problems, and provides an image capturing apparatus capable of performing accurate AF without impairing the appearance of focus both in a case where the subject is being still and in a case where the subject is moving.

According to a first aspect of the present invention, there is provided an image capturing apparatus, comprising: a detection unit configured to detect a subject; a focus adjusting unit configured to adjust a position of a focusing lens of an imaging optical system so as to focus the imaging optical system on the subject; and a setting unit configured to set a focus detection area, which is an area within an image capturing screen where the focus adjusting unit detects focus, based on detection results of the detection unit, wherein the setting unit sets the focus detection area based on the position of the face of the subject in a case where the subject is moving, and sets the focus detection area based on the position of the eye of the subject in a case where the subject is still.

According to a second aspect of the present invention, there is provided a method of controlling an image capturing apparatus, the method comprising: detecting a subject; adjusting a position of a focusing lens of an imaging optical system so as to focus the imaging optical system on the subject; and setting a focus detection area, which is an area within an image capturing screen where focus is detected in the focus adjustment, based on detection results in the detecting, wherein in the setting, the focus detection area is set based on the position of the face of the subject in a case where the subject is moving, and the focus detection area is set based on the position of the eye of the subject in a case where the subject is still.

According to a third aspect of the present invention, there is provided a computer-readable storage medium storing a program for causing a computer to execute each step of a method of controlling an image capturing apparatus, the method comprising: detecting a subject; adjusting a position of a focusing lens of an imaging optical system so as to focus the imaging optical system on the subject; and setting a focus detection area, which is an area within an image capturing screen where focus is detected in the focus adjustment, based on detection results in the detecting, wherein in the setting, the focus detection area is set based on the position of the face of the subject in a case where the subject is moving, and the focus detection area is set based on the position of the eye of the subject in a case where the subject is still.

Further features of the present invention will become apparent from the following description of exemplary embodiments with reference to the attached drawings.

DESCRIPTION OF THE EMBODIMENTS

Below, an interchangeable lens single lens reflex-type digital camera that is one embodiment of an image capturing apparatus of the present invention will be described in detail with reference to the attached drawings.

Figure 1:
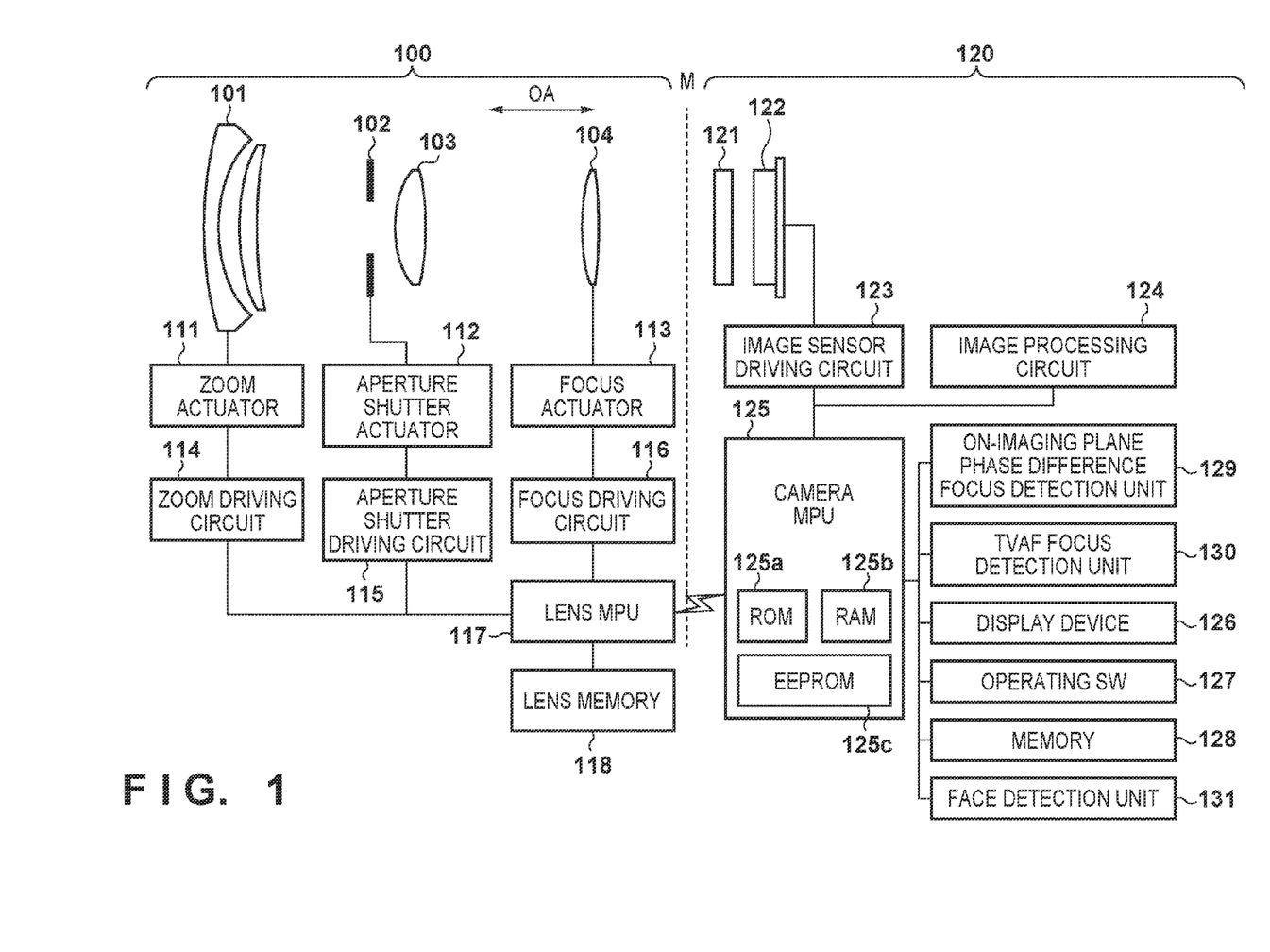
FIG. 1 is a block diagram that shows the configuration of a digital camera in one embodiment of the present invention.

FIG. 1 is a block diagram that shows the configuration of the digital camera of the present embodiment. The digital camera of the present embodiment is an interchangeable lens-type single lens reflex camera, and has a lens unit 100 and a camera body 120. The lens unit 100 is configured to be connected to the camera body 120 via a mount M, indicated with a dotted line in the center of FIG. 1.

The lens unit 100 has a first lens group 101, an aperture/shutter 102, a second lens group 103, and a focusing lens group (referred to below as simply a 'focusing lens') 104. Thus, the lens unit 100 includes the focusing lens 104 and has an imaging optical system that forms an image of a subject.

The first lens group 101 is disposed at an end of the lens unit 100, and is held so as to be capable of advancing/withdrawing in the directions of arrow OA, which are in the directions of the optical axis. The aperture/shutter 102 adjusts a light amount when shooting by adjusting its opening diameter, and also functions as a shutter for adjusting exposure time when shooting a still image. The aperture/shutter 102 and the second lens group 103 advance/withdraw together as a single unit in the directions indicated by arrow OA, and move in conjunction with advancing/withdrawing operation of the first lens group 101 to realize a zoom function. The focusing lens 104 performs focus adjustment by advancing/withdrawing in the directions indicated by arrow OA.

The lens unit 100 is further provided with a zoom actuator 111, an aperture shutter actuator 112, a focus actuator 113, a zoom driving circuit 114, an aperture shutter driving circuit 115, a focus driving circuit 116, and a lens memory 118. Also, these mechanisms and circuits that drive the imaging optical system are controlled by a lens MPU 117.

The zoom actuator 111 drives the first lens group 101 and the second lens group 103 to advance/withdraw in the directions of arrow OA, to perform a zoom operation. The aperture shutter actuator 112 controls the opening diameter of the aperture/shutter 102 to adjust a shooting light amount, and controls exposure time when performing still image shooting. The focus actuator 113 drives the focusing lens 104 to advance/withdraw in the directions of arrow OA to perform focus adjustment. The focus actuator 113 is provided with a function as a position detector that detects the current position of the focusing lens 104.

The zoom driving circuit 114 drives the zoom actuator 111 according to zoom operation by the photographer. The aperture shutter driving circuit 115 performs driving control of the aperture shutter actuator 112 to control the opening of the aperture/shutter 102. The focus driving circuit 116 performs driving control of the focus actuator 113 based on results of focus detection, and drives the focusing lens 104 to advance/withdraw in the directions of arrow OA to perform focus adjustment.

The lens MPU 117 performs computation and control of the entire imaging optical system to cause a subject image to be formed on an image sensor 122, and controls the zoom driving circuit 114, the aperture shutter driving circuit 115, the focus driving circuit 116, and the lens memory 118. Also, the lens MPU 117 detects the current lens position, and gives notification of lens position information in response to a request from a camera MPU 125. Optical information necessary for automatic focus adjustment has been stored in the lens memory 118.

The camera body 120 has an optical low pass filter 121 and the image sensor 122. The optical low pass filter 121 reduces false color or moire of a shot image. The image sensor 122 is configured with a C-MOS sensor and peripheral circuits of the C-MOS sensor, and has one photoelectric conversion element disposed on each of m light receiving pixels in a horizontal direction and n light receiving pixels in a vertical direction. The image sensor 122 is configured such that independent output of all pixels is possible. Also, some pixels among all of the pixels are pixels for focus detection, thus enabling autofocus by an on-imaging plane phase difference detection method (on-imaging plane phase difference AF).

Figure 2:
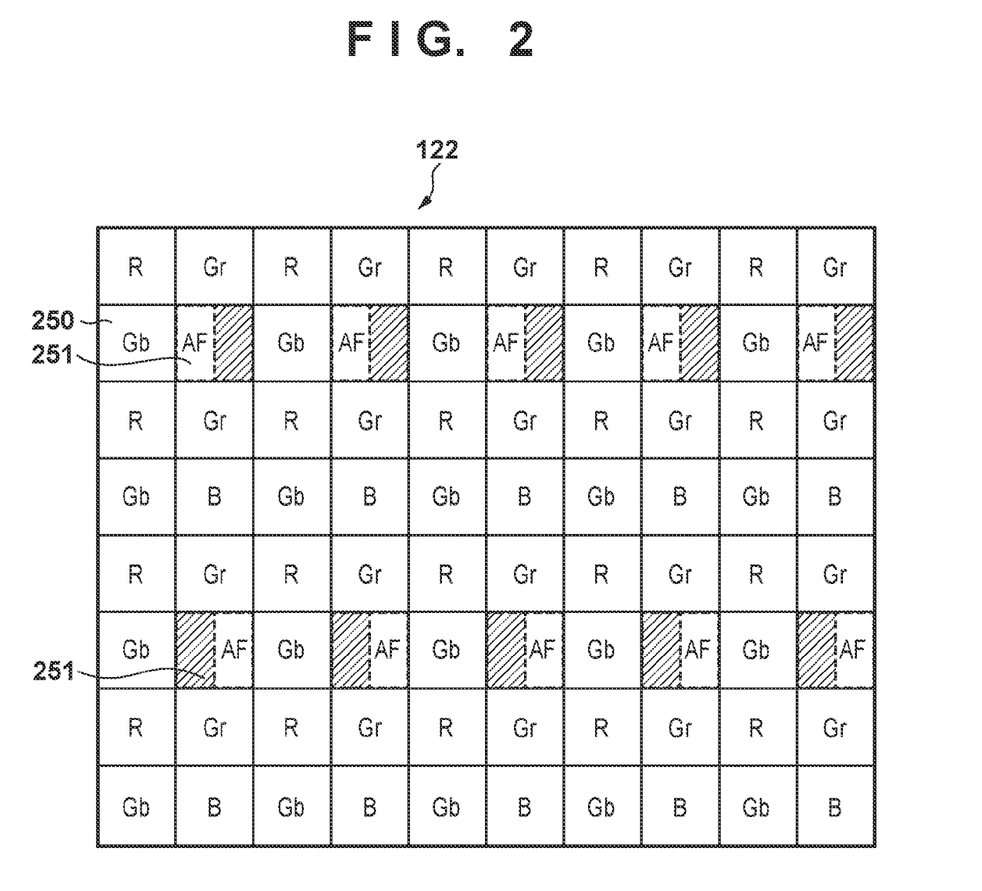
FIG. 2 shows a pixel array of an image sensor in one embodiment.

More specifically, as shown in FIG. 2, the image sensor 122 has a plurality of image capturing pixels 250 that generate a subject image by respectively receiving light beams that pass through all areas of an exit pupil of the imaging optical system that forms the subject image. Also, the image sensor 122 has a plurality of focus detection pixels 251 that respectively receive light beams that pass through different exit pupil areas of the imaging optical system. The plurality of focus detection pixels are collectively able to receive light beams that pass through all exit pupil areas of the imaging optical system. For example, in the image sensor 122, in a 2 column×2 row group of pixels, a pair of G pixels that are disposed at opposite corners are left remaining as image capturing pixels, and R and B pixels are replaced with focus detection pixels. In the present embodiment, on-imaging plane phase difference AF is realized by replacing part of the array of image capturing pixels disposed in the image capturing plane with the focus detection pixels 251, but the present invention is not limited to this method.

Returning to FIG. 1, the camera body 120 further has an image sensor driving circuit 123, an image processing circuit 124, the camera MPU 125, a display device 126, an operating switch group 127, a memory 128, an on-imaging plane phase difference focus detection unit 129, and a TVAF focus detection unit 130.

The image sensor driving circuit 123 controls operation of the image sensor 122, performs A/D conversion on an acquired image signal, and transmits the converted signal to the camera MPU 125. The image processing circuit 124 performs γ conversion, color interpolation, JPEG compression, and the like on the image acquired by the image sensor 122. The camera MPU (processor) 125 performs computation and control of the entire camera body 120. Also, the camera MPU 125 controls the image sensor driving circuit 123, the image processing circuit 124, the display device 126, the operating SW (operating switch group) 127, the memory 128, the on-imaging plane phase difference focus detection unit 129, and the TVAF focus detection unit 130.

The camera MPU 125 is connected to the lens MPU 117 via a signal line of the mount M, and issues a request to the lens MPU 117 to acquire the lens position or to drive the lens by a predetermined driving amount, acquires optical information specific to the lens unit 100, and so forth. A ROM 125a where programs that control camera operation have been stored, a RAM 125b configured to store variables, and an EEPROM 125c configured to store various parameters are built into the camera MPU 125. Further, the camera MPU 125 executes focus detection processing by a program stored in the ROM 125a. Details of the focus detection processing will be described later. Also, with the on-imaging plane phase difference AF, when there is a large image height at the focus detection position, vignetting has a large effect and reliability decreases, so the camera MPU 125 also corrects that effect.

The display device 126 is configured with an LCD or the like, and displays information related to the shooting mode of the camera, a preview image prior to shooting and a check image after shooting, an image displaying an in-focus state when performing focus detection, and the like. The operating switch group 127 is configured with a power switch, a release (shooting trigger) switch, a zoom operation switch, a shooting mode selection switch, and the like. The memory 128 of the present embodiment is a removable flash memory, and records a shot image.

The on-imaging plane phase difference focus detection unit (first focus detection unit) 129 performs focus detection processing by a phase difference AF method using image signals of focus detection pixels that have been embedded in the image sensor 122. More specifically, the on-imaging plane phase difference focus detection unit 129 performs on-imaging plane phase difference AF based on an offset amount of a pair of images formed in focus detection pixels by light beams that pass through a pair of pupil areas of the image capturing optical system.

The TVAF focus detection unit (second focus detection unit) 130 performs focus detection processing by a contrast detection method based on a contrast component of image information obtained by the image processing circuit 124. In the focus detection processing of the contrast method, the focusing lens 104 is moved along the optical axis to detect a position of the focusing lens where a contrast evaluation value (TVAF evaluation value) becomes a peak value. Also, a face detection unit 131 detects the face of a person by extracting a characteristic amount from image information obtained by the image processing circuit 124.

Thus, in the present embodiment, on-imaging plane phase difference AF and contrast AF are combined, and the focus detection in both methods of AF is based on information on the image capturing plane. Therefore, it is possible to improve the accuracy of focus detection compared to a case where phase difference AF performed using a sensor that has been disposed at a position different than the image capturing plane and contrast AF (TVAF) are combined.

Figure 3:
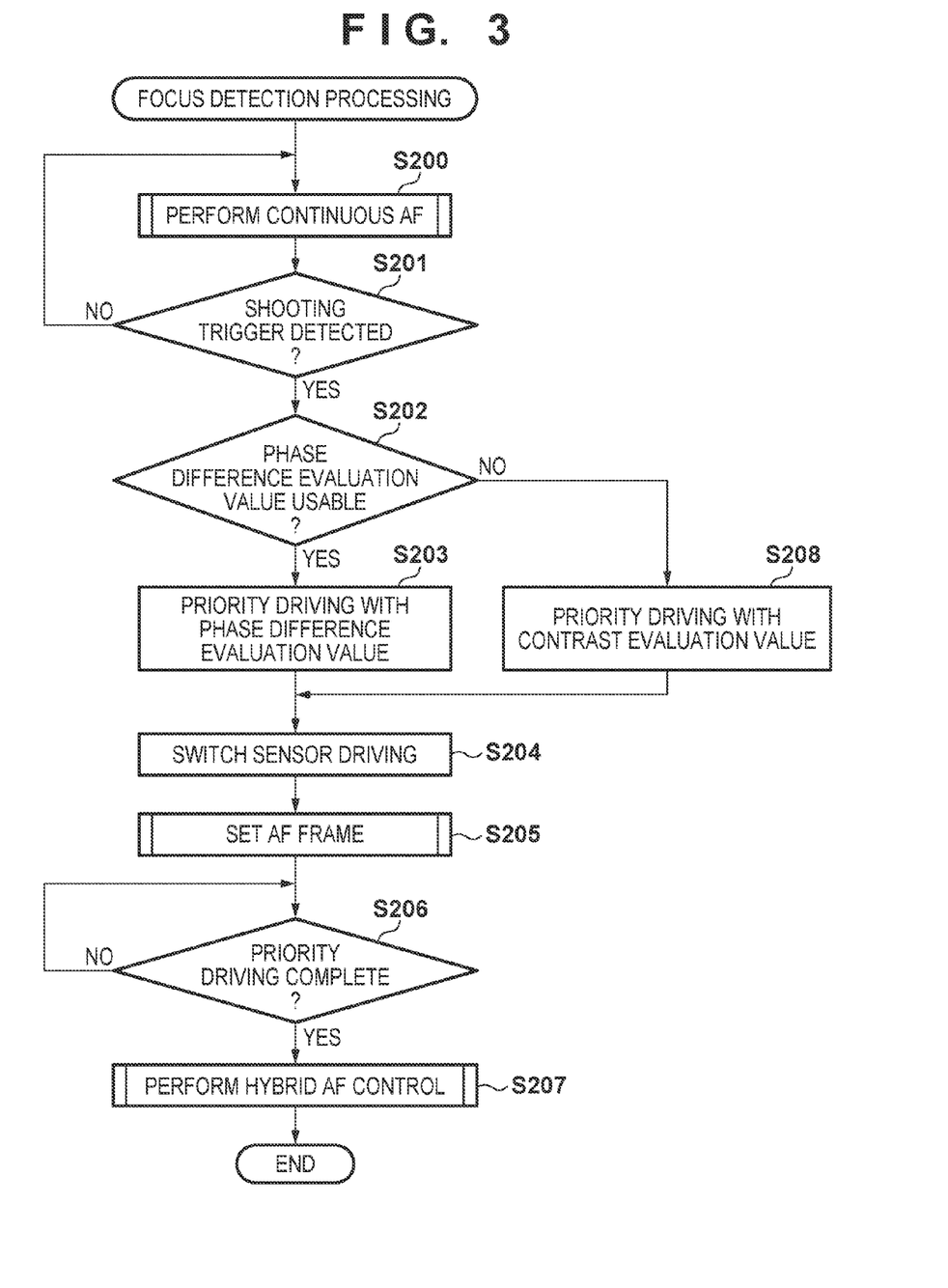
FIG. 3 is a flowchart for illustrating focus detection processing in one embodiment.

Below, focus detection processing executed by the camera MPU (processor) 125 will be described with reference to FIGS. 3 to 7B. In FIG. 3 and subsequent drawings, 'S' is an abbreviation of 'step'.

FIG. 3 is a flowchart for illustrating focus detection processing executed by the camera MPU 125. In step S200, the camera MPU 125 executes continuous AF in which a subject is continuously focused on after starting up the camera. Details of the continuous AF will be described later with reference to FIG. 4. In step S201, when operation of a release (shooting trigger) switch in the operating switch group 127 was detected, processing proceeds to step S202. In step S202, it is determined whether or not an evaluation value for focus adjustment by phase difference AF (below, a 'phase difference evaluation value') can be used. As the method for determining whether or not a phase difference evaluation value can be used, a method is conceivable in which reliability is obtained according to image height or F-stop value, and it is determined whether or not this can be used, for example, but the method used has no direct connection to the present embodiment, so a detailed description thereof is omitted here.

When determined in step S202 that the phase difference evaluation value can be used, processing proceeds to step S203, where the focusing lens 104 is moved by an obtained focus driving amount. When determined in step S202 that the phase difference evaluation value cannot be used, processing proceeds to step S208, where the focusing lens 104 is moved to a scan start position based on an evaluation value for focus adjustment by contrast AF (below, a 'contrast evaluation value'). In this case, the greater the in-focus degree of the contrast evaluation value, the closer the current focus position is to the in-focus position, so the driving amount of the focusing lens will be correspondingly reduced.

In step S204, driving of the image sensor 122 is switched for performing autofocus. For example, if it is desired to shorten the AF time, the number of pixels may be reduced and high speed image read-out performed, or in a dimly-lit scene or the like the number of pixels may be increased in order to obtain a better signal-to-noise ratio, for example. In step S205, setting of an AF frame (focus detection area) described later is performed. In step S206, processing waits for completion of the focus driving executed in steps S203 or S208. In step S207, hybrid AF control described later is performed, and then processing is ended.

Figure 4:
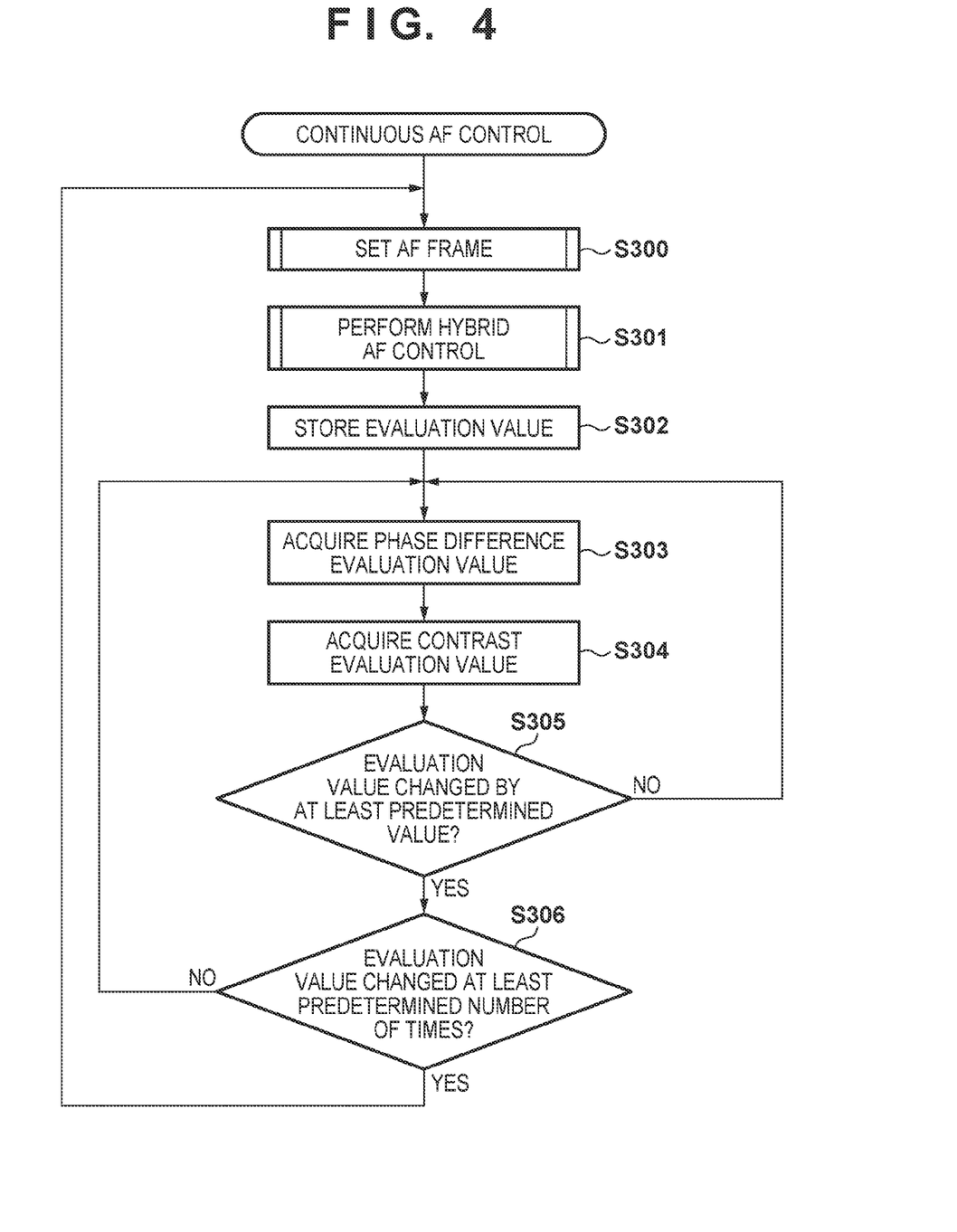
FIG. 4 is a flowchart for illustrating continuous AF in FIG. 3.
Figure 5:
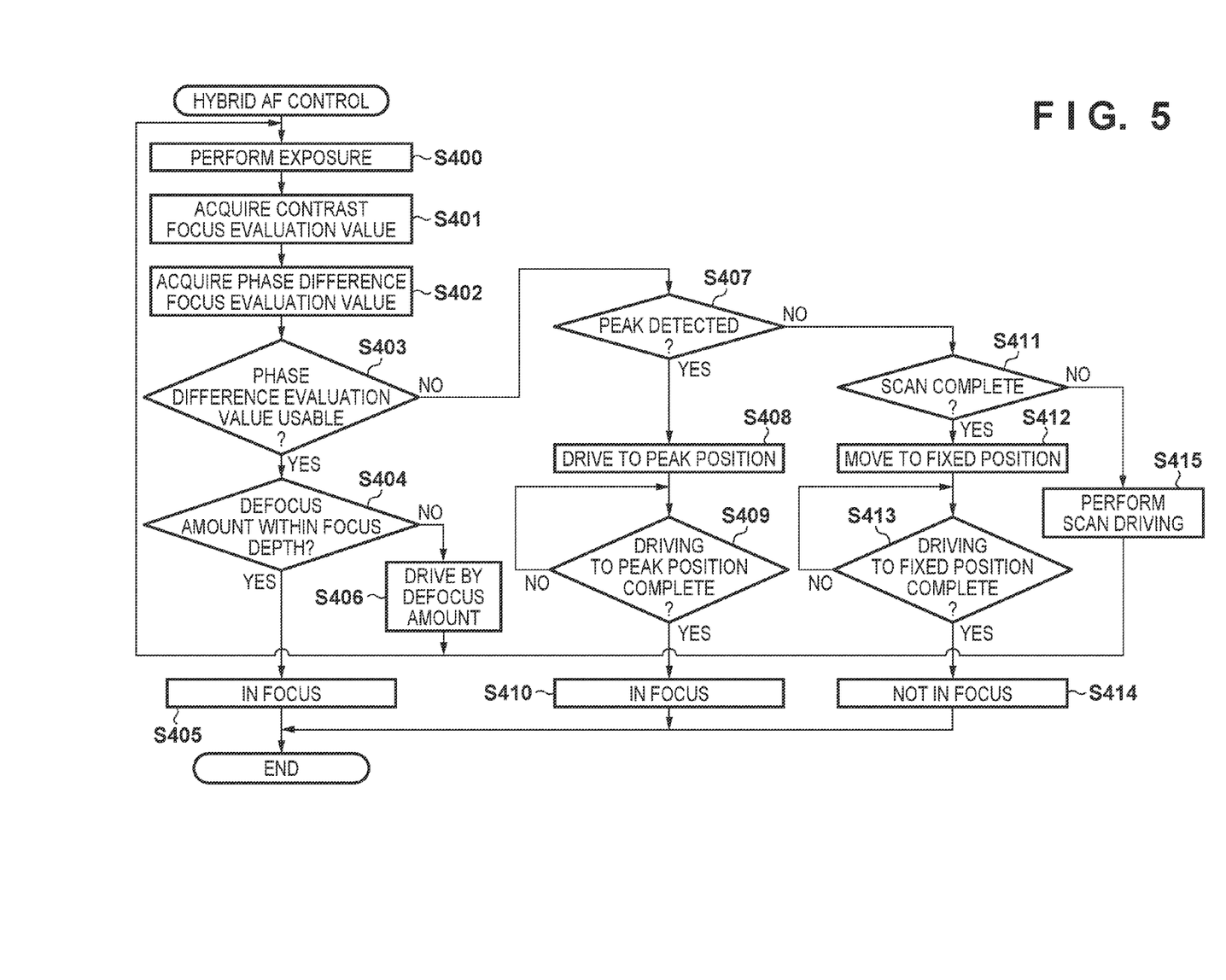
FIG. 5 is a flowchart for illustrating hybrid AF in FIGS. 3 and 4.

FIG. 4 is a flowchart for illustrating operation of the continuous AF in step S200 in FIG. 3. First, in step S300, the AF frame setting described later is performed. In step S301, hybrid AF control described later with reference to FIG. 5 is performed. In step S302, a phase difference evaluation value and a contrast evaluation value are each stored in the RAM 125b. In step S303, a latest phase difference evaluation value is acquired and stored in the RAM 125b. In step S304, a latest contrast evaluation value is acquired and stored in the RAM 125b. In step S305, the evaluation value stored in the RAM 125b acquired in step S301 is compared to the latest evaluation value acquired from step S303 onward to determine whether the evaluation value has changed by at least a predetermined amount. When the evaluation value has changed by at least the predetermined amount, processing proceeds to step S306, and when the evaluation value has not changed by at least the predetermined amount, processing returns to step S303 and the evaluation values are again observed. In step S306, it is determined whether the change of at least a predetermined amount in step S305 has occurred at least a predetermined number of times. When determined in step S306 that the change has occurred at least the predetermined number of times, processing returns to step S300, where the hybrid AF operation is performed again. When determined in step S306 that the change has not occurred at least the predetermined number of times, processing returns to step S303, and the evaluation values are again observed.

Here, in the present embodiment, when in an in-focus state with the phase difference evaluation value in step S302, only phase difference evaluation values are compared in step S305. By doing so, when in an in-focus state with the phase difference evaluation value, it is possible to avoid a hunting operation that performs AF again due to fluctuation of the contrast evaluation value. However, for example in a case of following focus of a moving body or the like, if it is desired to perform AF as quickly as possible, changes in the phase difference evaluation values and contrast evaluation values may be determined by a logical disjunction.

FIG. 5 is a flowchart for illustrating the hybrid AF control in step S207 in FIG. 3 and step S301 in FIG. 4. In step S400, image data for calculating an evaluation value is exposed. In step S401, a contrast evaluation value is acquired. In step S402, a phase difference evaluation value is acquired. In step S403, it is determined whether or not the phase difference evaluation value can be used. As the method of determining whether or not the phase difference evaluation value can be used, as already described with reference to FIG. 3, a method is conceivable in which reliability is obtained according to image height or F-stop value, and it is determined whether or not this can be used, for example. In step S404, it is determined whether or not a defocus amount to an in-focus position of the phase difference evaluation value is within a predetermined depth, and if within the predetermined depth, processing moves to the in-focus state of step S405 and then ends. When the user operated the operating switch group 127 or the like to move to the in-focus state, display is output to the display device 126 or the like such that being in the in-focus state is understood.

When it was determined in step S404 that the defocus amount is outside of the predetermined depth, in step S406, the focusing lens 104 is moved by an obtained defocus driving amount and then processing returns to step S400. If it was not determined in step S403 that the phase difference evaluation value can be used, processing proceeds to step S407, where it is determined whether or not a peak has been detected for the contrast evaluation value. This peak is determined by whether or not a maximum value of at least a predetermined value has been detected among the contrast evaluation values acquired at each lens position. In step S408 the focusing lens 104 is moved to the peak position that was detected in step S407. In step S409, processing waits for the focusing lens 104 to be moved to the peak position, and afterward processing proceeds to step S410 to move to the in-focus state, and then processing is ended.

In step S411, it is determined whether or not the focusing lens 104 was scanned through all areas from a far end to a near end. If the focusing lens 104 was scanned through all areas, processing proceeds to step S412, and if the focusing lens 104 was not scanned through all areas, processing proceeds to step S415. In step S415, the focusing lens 104 is moved by a predetermined amount, processing returns to step S400, and scanning is continued. Because a peak could not be detected in step S412, the focusing lens 104 is moved to an appropriate fixed position. A scan start position or a position beyond focus may be adopted for this fixed position. Afterward, in step S414 a change is made to a non-focused state and then processing is ended. When the user operated the operating switch group 127 or the like to move to the in-focus state, display is output to the display device 126 or the like such that being in the in-focus state is understood.

Figure 6:
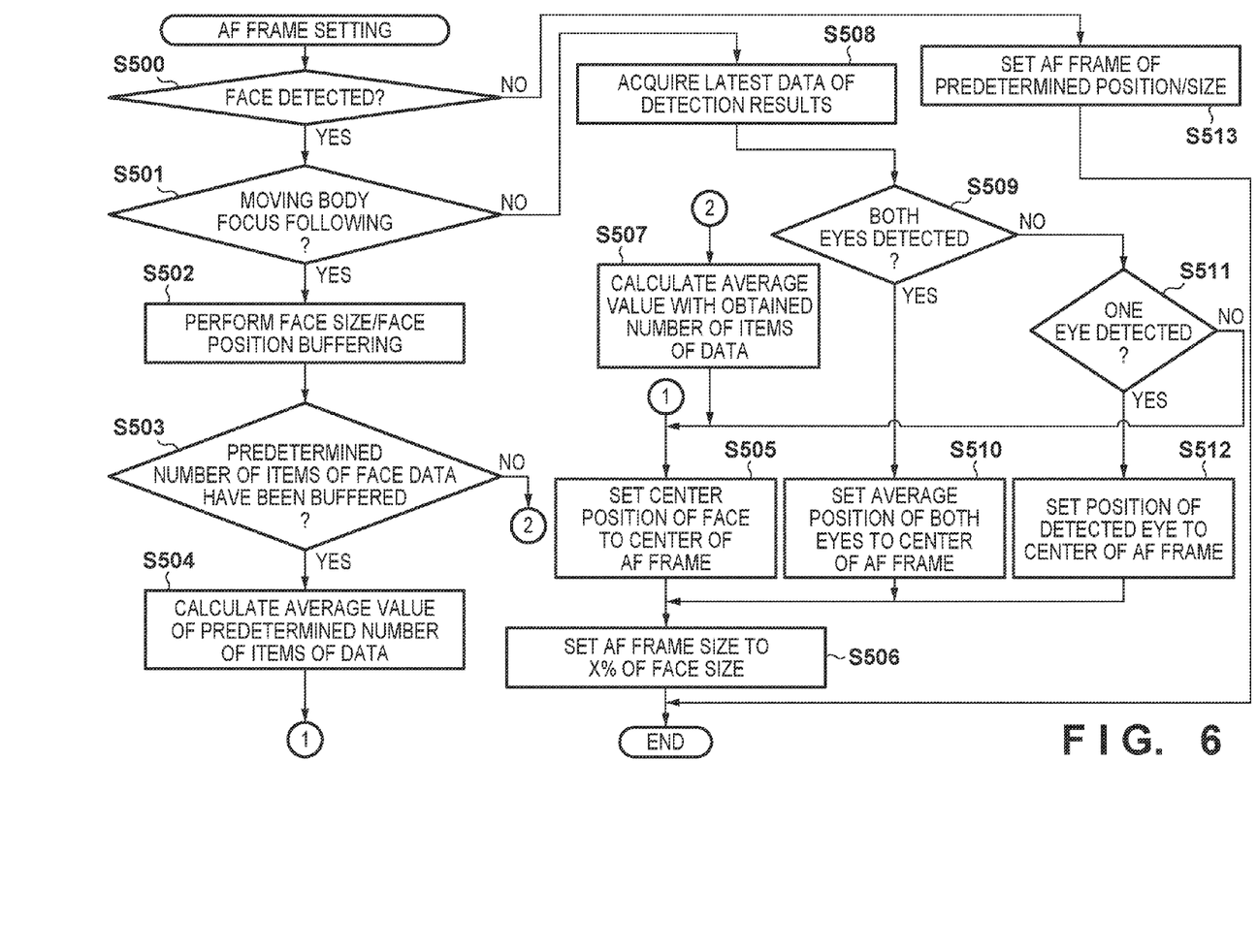
FIG. 6 is a flowchart for illustrating an AF frame setting operation in FIGS. 3 and 4.

FIG. 6 is a flowchart for illustrating operation to set an AF frame (focus detection area within an image capturing screen) in step S205 in FIG. 3 and step S300 in FIG. 4. In step S500, it is determined whether or not a face has been detected by the face detection unit 131. If a face has been detected, processing proceeds to step S501, and if a face has not been detected, processing proceeds to step S512. In step S501, it is determined whether or not the current state is a moving body focus following state. This determination may be performed by discriminating movement from the coordinates or the size of a face, or a configuration may be adopted in which a moving body tracking AF method can be designated from the operating switch group 127 or the like. If determined in step S501 that the current state is a moving body focus following state, processing proceeds to step S502, where information of a face size and face position is stored in a buffer. The buffer in the present embodiment is configured as a ring buffer, and data from latest data to data prior to a predetermined frame is stored.

In step S503, it is determined whether or not a predetermined number of data items (data of a predetermined number of times) has been stored in the buffer, and if a predetermined number of data items has been stored, processing proceeds to step S504, and if a predetermined number of data items has not been stored, processing proceeds to step S507. In step S504, an average value of a predetermined number of data items is calculated for the face size and position. In step S505, the center position of the face is set to the center of the AF frame. In step S506, an AF frame size that is a proportion of X % of the face is set. In the present embodiment, the actual size of the face (X=100) is adopted, but the AF frame size may be set smaller than the face detection result in order to prevent a background void, or may be set larger than the face detection result in order to suppress changes in evaluation values due to the face entering/exiting the AF frame. If a predetermined number of items of face data has not been stored in the buffer in step S503, in step S507, average values are obtained from the obtained data, and then processing proceeds to step S505.

When determined in step S501 that the current state is not a moving body focus following state, processing proceeds to step S508. In step S508, information of the face that is the latest data of face detection, and eye size and position, is acquired. In step S509, it is determined whether or not both eyes have been detected. If both eyes have been detected, processing proceeds to step S510, and average coordinates of both eyes are set to the center of the AF frame. If both eyes have not been detected, in step S511 it is determined whether or not one eye has been detected. If one eye has been detected, coordinates of the detected eye are set to the center of the AF frame. If an eye has not been detected in step S511, processing proceeds to step S505, where the center position of the face is set to the center of the AF frame.

Figure 7A:
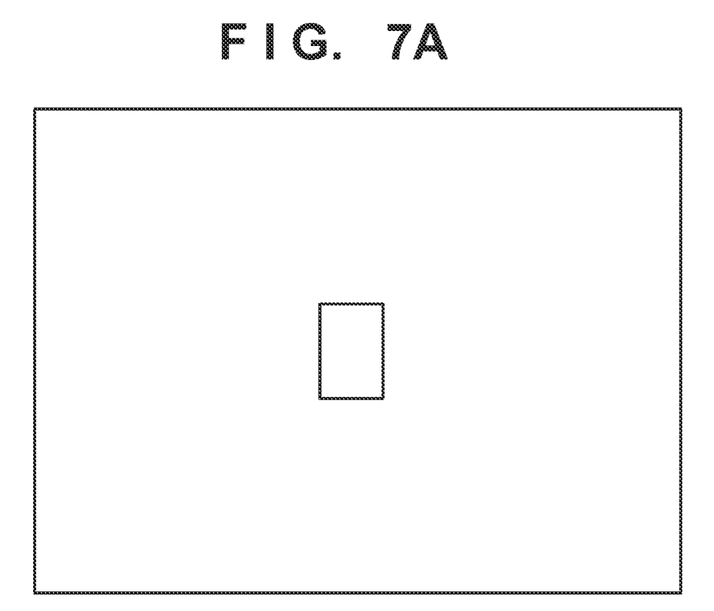
FIGS. 7A and 7B show center one-point AF frame setting and multi-point AF frame setting.
Figure 7B:
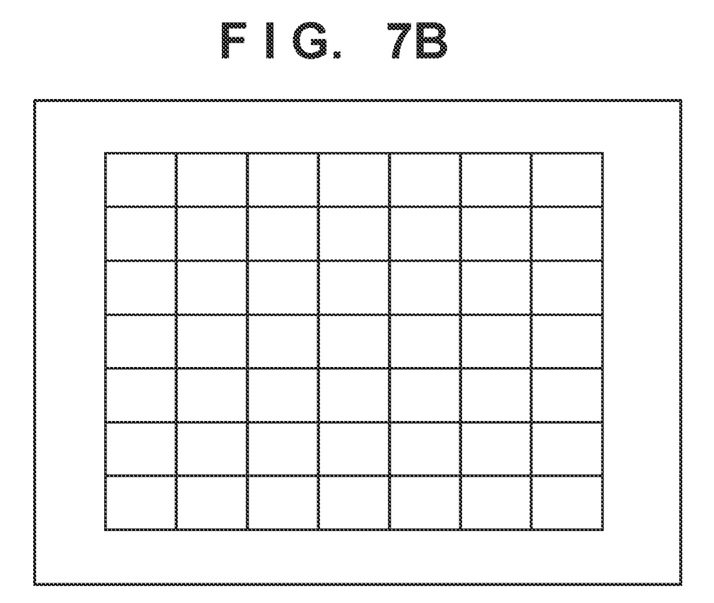

If a face has not been detected in step S500, processing proceeds to step S513, where the AF frame is set to a predetermined size and position. A single AF frame may be set to the center of the screen as shown in FIG. 7A, or a plurality of AF frames may be set within a predetermined area as shown in FIG. 7B.

As described above, when calculating a detection defocus amount of contrast evaluation values and phase difference evaluation values, an AF frame is set according to the face detection results and focus following state. Specifically, in a case of following focus on a moving body, it is conceivable that the detection results of eyes of a person are likely to change, so the AF frame is set based on the center position of the face. Also, in a case of focusing on a still body, it is conceivable that the detection results of eyes of a person are unlikely to change, so the AF frame is set based on the position of the eyes. By adopting such a configuration, it is possible to increase the accuracy of focus adjustment.

Other Embodiments

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2015-018797, filed Feb. 2, 2015 which is hereby incorporated by reference herein in its entirety.

What is claimed is:

1. An image capturing apparatus, comprising at least one processor or circuit that performs the operations of the following units:
   a detection unit to detect a subject;
   a focus adjusting unit to adjust a position of a focusing lens of an imaging optical system so as to focus the imaging optical system on the subject; and
   a setting unit to set a focus detection area, which is an area within an image capturing screen where the focus adjusting unit detects focus, based on detection results of the detection unit,
   wherein the setting unit automatically sets the focus detection area based on information of a face of the subject in a case where a focus adjustment mode is set to a moving body focusing mode in accordance with a user's operation, and automatically sets the focus detection area based on a position of an eye of the subject in addition to the information of the face in a case where the focus adjustment mode is not set to the moving body focusing mode in accordance with the user's operation.

2. The image capturing apparatus according to claim 1, wherein in a case where both eyes of the subject have been detected by the detection unit, the setting unit sets the center position of the focus detection area to average coordinates of both eyes of the subject in a case where the focus adjustment mode is set to a mode which is not the moving body focusing mode in accordance with the user's operation.

3. The image capturing apparatus according to claim 1, wherein in a case where only one eye of the subject has been detected by the detection unit, the setting unit sets the center position of the focus detection area to the center position of the one eye of the subject in a case where the focus adjustment mode is set to a mode which is not the moving body focusing mode in accordance with the user's operation.

4. The image capturing apparatus according to claim 1, wherein the setting unit sets the focus detection area based on a value obtained by averaging the position of the face of the subject detected across a plurality of times by the detection unit in a case where the focus adjustment mode is set to the moving body focusing mode in accordance with a user's operation.

5. The image capturing apparatus according to claim 1, wherein the setting unit sets the focus detection area to a size smaller than the size of the face of the subject.

6. The image capturing apparatus according to claim 1, wherein the setting unit sets the focus detection area to a size larger than the size of the face of the subject.

7. The image capturing apparatus according to claim 1, wherein the focus adjusting unit focuses the imaging optical system using an on-imaging plane phase difference detection processing or a contrast detection processing.

8. The image capturing apparatus according to claim 7, wherein the focus adjusting unit focuses the imaging optical system using the on-imaging plane phase difference detection processing in a case where the phase difference evaluation value obtained by the on-imaging plane phase difference detection processing can be used.

9. The image capturing apparatus according to claim 1, wherein the setting unit sets the focus detection area based on the position of the eye of the subject in addition to the position of the face of the subject in a case where the focus adjustment mode is set to a still body focusing mode in accordance with the user's operation.

10. A method of controlling an image capturing apparatus, the method comprising:
    detecting a subject;
    adjusting a position of a focusing lens of an imaging optical system so as to focus the imaging optical system on the subject; and
    setting a focus detection area, which is an area within an image capturing screen where focus is detected in the focus adjustment, based on detection results in the detecting,
    wherein in the setting, the focus detection area is automatically set based on information of a face of the subject in a case where a focus adjustment mode is set to a moving body focusing mode in accordance with a user's operation, and the focus detection area is automatically set based on a position of an eye of the subject in addition to the information of the face in a case where the focus adjustment mode is not set to the moving body focusing mode in accordance with the user's operation.

11. A non-transitory computer-readable storage medium storing a program for causing a computer to execute each step of a method of controlling an image capturing apparatus, the method comprising:
    detecting a subject;
    adjusting a position of a focusing lens of an imaging optical system so as to focus the imaging optical system on the subject; and
    setting a focus detection area, which is an area within an image capturing screen where focus is detected in the focus adjustment, based on detection results in the detecting,
    wherein in the setting, the focus detection area is automatically set based on information of a face of the subject in a case where a focus adjustment mode is set to a moving body focusing mode in accordance with a user's operation, and the focus detection area is set based on a position of an eye of the subject in addition to the information of the face in a case where the focus adjustment mode is not set to the moving body focusing mode in accordance with the user's operation.

12. An image capturing apparatus, comprising:
    an image sensor that has a plurality of pixels which photo-electrically convert light beams passed through different pupil area of an imaging optical system and are capable of outputting a pair of focus detection signals; and at least one processor or circuit that performs the operations of the following units:

a first detection unit to detect a face of a subject from an image signal output from the image sensor;

a second detection unit to detect an eye of the subject from the image signal output from the image sensor;

a focus adjusting unit to adjust a position of a focusing lens of an imaging optical system so as to focus the imaging optical system on the subject; and a setting unit to set a focus detection area, which is an area within an mage capturing screen where the focus adjusting unit detects focus, based on detection results of the first and second detection units, wherein the setting unit sets the focus detection area by differently using the detection results of the first and second detection units for a moving body focusing mode and another focusing mode.

13. The image capturing apparatus according to claim 12, wherein the setting unit automatically sets the focus detection area based on information of the face of the subject in a case where a focus adjustment mode is set to the moving body focusing mode, and automatically sets the focus detection area based on a position of the eye of the subject in addition to the information of the face of the subject in a case where the focus adjustment mode is not set to the moving body focusing mode.

* * * * *